United States Patent [19]

Nakao

[11] Patent Number: 4,854,648

[45] Date of Patent: Aug. 8, 1989

[54] AUTOMATIC AIR BRAKING SYSTEM

[75] Inventor: Yasuo Nakao, Kobe, Japan

[73] Assignee: Nippon Air Brake Co., Ltd., Kobe, Japan

[21] Appl. No.: 210,544

[22] Filed: Jun. 23, 1988

[30] Foreign Application Priority Data

Jul. 15, 1987 [JP] Japan ................... 62-176516

[51] Int. Cl.$^4$ ............................. B60T 15/52
[52] U.S. Cl. ................................. 303/69; 303/81
[58] Field of Search ............ 303/20, 37, 38, 47, 303/69, 81, 82, 83

[56] References Cited

U.S. PATENT DOCUMENTS

| | | | |
|---|---|---|---|
| 3,966,269 | 6/1976 | McEathron | 303/69 X |
| 4,145,090 | 3/1979 | Hart | 303/69 X |
| 4,449,759 | 5/1984 | Eder | 303/82 X |
| 4,679,863 | 7/1987 | Ikeda et al. | 303/20 X |

*Primary Examiner*—Duane A. Reger
*Attorney, Agent, or Firm*—J. B. Sotak

[57] ABSTRACT

An automatic air braking system for a railway train having a flow detector for sensing the flow of pressurized air in the brake line during a brake release command time. A pilot chamber located in a relay valve which is pressurized when a signal from the flow detector exceeds a first predetermined pressure value and which stops the pressurization when the flow signal drops below a second predetermined pressure value. The brake line runs from the lead unit or locomotive of the train and through the railway vehicle or freight cars connected to and pulled by the lead unit or locomotive. The relay valve which is an automatic-lapping-type is located in the lead unit or locomotive in which the pilot chamber is exhausted in response to the reception of a brake release command. An output chamber, which is located in the relay valve, is connected to the brake line of the lead unit or locomotive. The output chamber is pressurized in response to pressurization of the pilot chamber and is exhausted in response to exhaustion of the pilot chamber, so as to accelerate the brake release operation along the length of the train.

12 Claims, 3 Drawing Sheets

AUTOMATIC AIR BRAKING SYSTEM

FIELD OF THE INVENTION

This invention relates to an automatic air brake control system for use on railway vehicles of a train including a lead unit, such as a locomotive, which is connected to trailing vehicles, such as, freight cars, and having a brake line running the length of the train which is pressurized and exhausted by a valve located in the locomotive. In other words, when the train is in motion, the brake line on each vehicle of the railway train is supplied with air pressure by the relay valve on the lead unit or locomotive, and is maintained at a certain pressure so that the brakes of each railway vehicle or freight car are in a released position. Now, when a brake command is initiated, the brake line of each railway vehicle or freight car is exhausted or depressurized by the relay valve on the lead unit or locomotive. Thus, the brakes on each railway vehicle or freight car are directly operated as a function of the amount of exhaustion or depressurization. This invention particularly relates to an air brake control system which employs a brake release acceleration function.

BACKGROUND OF THE INVENTION

There are a number of automatic air brake systems in the prior art teachings. One of these previous systems is exemplified in the present application and is shown and disclosed in NABUKO GIHOO No. 63, pages 50 and 51, published January, 1987. This example of the prior art system will be explained hereinafter by reference to FIGS. 7 and 8 of the drawings of the present application.

Figure 7:
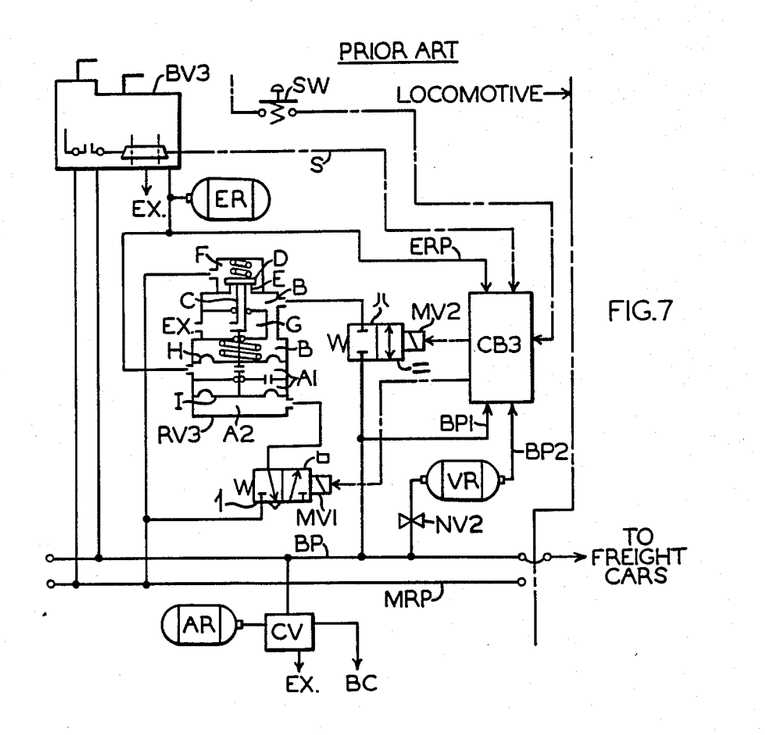
FIG. 7 is a schematic block diagram of a prior art of a brake control system for a railway train.
Figure 8:
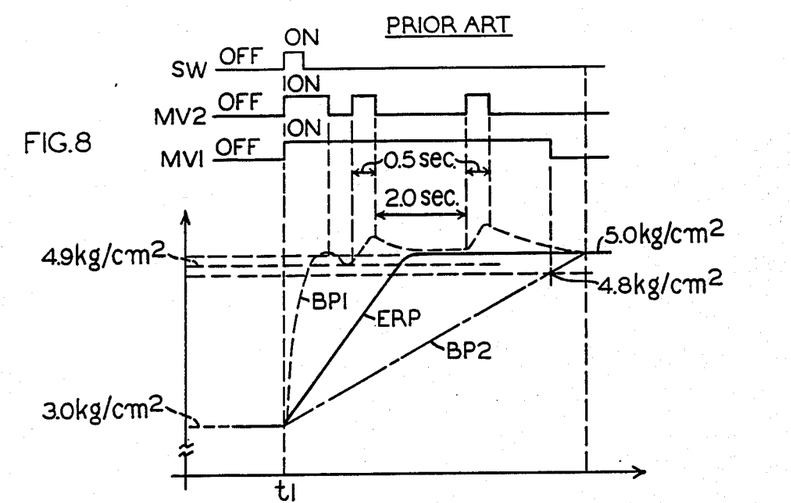
FIG. 8 is a graphic representation of the operation of the brake pipes, balanced air reservoir, the early charging switch and the first and second electromagnetic switches of FIG. 7.

Referring now to FIG. 7 of the drawings, there is shown a brake control system in which normal braking is achieved and is illustrated in the graphic representation of FIG. 8.

At time $t_1$, the brake valve BV3 is moved into overlapped position after the normal brake operation. This causes a conditioning signal S which is equal to zero (0) to be conveyed to the controller CB3 by the brake valve BV3. At the same time, the balance air reservoir ER is depressurized by a selected amount, namely, by 2.0 Kg/cm², reduction occurs so that its pressure remains at 3.0 Kg/cm².

In addition, the early charging switch SW is in an OFF position so that the electrical controller CB3 switches the first electromagnetic valve MV1 to its OFF position. Thus, the valve MV1 assumes its exhause position ↑. At the same time, the second electromagnetic valve MV2, for closing the brake line BP, is turned OFF and assumes its closed position ){.

As shown in FIG. 7, a first pilot chamber A1 of a relay valve RV3 is connected to the balance air reservoir ER, and the pressure is reduced by a selected amount. The relay valve RV3 includes a second pilot chamber A2 for early charging which is opened to atmosphere via the first electromagnetic valve MV1. Thus, the relay valve RV3 is in the overlapped position, which vents the output chamber B by a selected amount and keeps it at that pressure. In this overlapped state, the air supply valve D is seated on hollow exhaust valve rod C and also is seated on air supply valve seat E. Thus, the output chamber B and the exhaust chamber G are blocked off from the air supply chamber F. Accordingly, the up and down forces on the balance piston diaphragm H are balanced, as viewed in FIG. 7.

It will be appreciated that during a normal braking operation the brake line BP is decreased by a selected amount of pressure. Before braking, the brake line is maintained at a normal pressure level due to the second electromagnetic valve MV2 being in an ON or open position. It will be noted that the brake control valve CV on the lead unit or locomotive and the brake control valves (not shown) on the trailing railway vehicles or freight cars revert to an overlapped state after the braking operation. The pressure in the brake cylinder BC of each railway vehicle or freight car is maintained at the pressure corresponding to the normal brake command signal.

Under normal running conditions, the brake valve BV3 is switched into the normal brake position so that the balance air reservoir ER begins to be pressurized. The pressure in this balance air reservoir ER is conveyed into the controller CB3 via line ERP.

At the same time, when the early charging switch SW is turned ON, the controller CB3 switches the first electromagnetic valve MV1 to an ON condition so that it is shifted to the air supply position □. Simultaneously, the second electromagnetic valve MV2 is turned ON and switches to its open position =.

Therefore, the first pilot chamber A1 of the relay valve RV3 is pressurized by the above-mentioned balance air reservoir ER, while the second pilot chamber A2 is pressurized by the high pressure air in the main air reservoir line MRP via the first electromagnetic valve MV1. The balance piston diaphragm H and the supplemental piston diaphragm I cause the exhaust valve rod C to move upward as viewed in FIG. 7 so that the air supply valve D becomes unseated from the air supply valve seat E. This is called air supply exhaust operation.

Therefore, the air is supplied to the brake line BP by the main air reservoir line MRP via the air supply chamber F and the output chamber B of the relay valve RV3 and via the open position = of the second electromagnetic valve MV2. Thus, the pressure in the brake line BP quickly rises.

This pressure in the brake line BP is conveyed to the electrical controller CB3 via line BP1 as well as by line BP2 via the throttle valve NV2 and the buffer or cushion air reservoir VR, as shown in FIG. 8. Thus, the pressure in the brake line BP1 is equal to the pressure in the brake line BP of the lead unit or locomotive, and the pressure in the brake line BP2 is equal to the pressure in the supplemental air reservoir AR of the first connected railway vehicle or freight car.

When the pressure in the brake line BP1 exceeds a first predetermined pressure, such as 4.9 Kg/cm², the controller CB3 causes the second electromagnetic valve MV2 to switch OFF to its closed position ){.

Subsequently, when the pressure in the brake line BP1 falls below a first predetermined pressure, the electrical controller CB3 again causes the second electromagnetic valve MV2 to switch ON to its opened position =. The electromagnetic valve MV2 remains in this opened position = for a first predetermined period of time, such as, 0.5 seconds as shown in FIG. 7. When the first predetermined time has expired, the second electromagnetic valve MV2 switches to an OFF condition. Moreover, even if the pressure in the brake line BP1 does not decrease to the above-mentioned first predetermined pressure, the second electromagnetic valve MV2 passes a second predetermined time, such as 2.0 seconds so that after it is turned OFF, while brake line BP2 is less than a second predetermined pressure, such as 4.8 Kg/cm$^2$, the second electromagnetic valve MV2 will switch back to its ON condition.

Thus, the pressure build-up in the brake line BP continues until the brake line BP2 reaches the above-mentioned second predetermined pressure of 4.8 Kg/cm$^2$.

When the brake line BPZ reaches the second predetermined pressure, the controller CB3 switches the first electromagnetic valve MV1 to an OFF condition so that it returns to its exhaust position ⌐. Thus, the relay valve RV3 returns to the normal release operation so that the second pilot chamber A2 is opened to atmosphere.

Now, when the pressure in the output chamber B and in brake line BP1 balances the pressure in the balance air reservoir ER and in line ERP, which is regulated to a specified pressure, namely 5.0 Kg/cm$^2$, the relay valve RV3 returns to an overlapped state.

At the same time, the brake line BP is pressurized to a specified pressure so that the brake control valve CV is switched to its exhaust position and supplements the supplemental air reservoir AR up to a selected pressure. Simultaneously, the brake control valve CV opens the brake cylinder BC to atmosphere.

Under this condition, the brakes are released and the brake valve BV3 is returned to the normal brake position. The balance air reservoir ER is exhausted by a selected amount. Simultaneously, the first pilot chamber A1 is also exhausted so that the exhaust valve rod C in the relay valve RV3 moves downwardly as shown in FIG. 7 so that it opens hollow rod C and exhausts the output chamber B. This is called exhaust operation.

When the brake valve BV3 is in normal braking operation, the status signal S is equal to one (1). Therefore, the controller CB3 switches the second electromagnetic valve MV2 to an ON condition, so that it assumes an opened position =.

Therefore, the brake line BP is connected to the output chamber B through the opened position = of the second electromagnetic valve MV2. Correspondingly, the brake control valve CV of each car controls the braking operation.

When the exhaustion of the brake line BP reaches a specified amount, the relay valve RV3 returns to the overlap state, as shown in FIG. 7. At the same time, the controller CB3 switches the second electromagnetic valve MV2 to its OFF condition so that it assumes the closed position ⌐.

In the prior art system, as described above, the repeated operation of the second electromagnetic valve MV2 for opening and closing the brake line BP is excessive so that wear and failure is likely to occur. It is obvious that this is a serious problem.

In addition, in a short train, in which the number of connected railway vehicles or freight cars is relatively small, the early charging control is accomplished by the operation of the early charge switch SW. Accordingly, the brake lines BP of all of the railway vehicles or freight cars will be over-charged to a pressure which is more than the selected minimum pressure. This is another disadvantage.

In other words, the first problem, described above, results from the fact that the second electromagnetic valve MV2 repeatedly switches between its ON and OFF positions during the period from the START of the early charge control to the END, as shown in FIG. 8 so that its cycle is very short.

The second problem, described above, results from the fact that the pressure BP1 in the brake line BP of the lead unit or locomotive and the pressure BP2 in the supplemental air reservoir AR of the first railway vehicles or freight cars, are effected by the setting of the throttle valve NV2 and the buffer air reservoir VR. This is used to switch the first electromagnetic valve MV1 and the second electromagnetic valve MV2 between their ON and OFF positions during the early charge control. In particular, the pressure build-up rate of the brake line BP2 is based on the throttling effect of the throttle valve NV2 and the capacity of the buffer air reservoir VR which are set so that the early charge control works more effectively in proportion to the brake line BP capacity of a long train in which the number of connected railway vehicles or freight cars is relatively large. Thus, in the case of a short train, if the brake line BP of all of the connected railway vehicles or freight cars is greater than a selected pressure, the brake line will not exceed the above-mentioned second predetermined pressure of 4.8 Kg/cm$^2$ so that the early control operation is continued.

OBJECTS AND SUMMARY OF THE INVENTION

Accordingly, it is an object of this invention to continuously supply pressurized air which has a pressure which is higher than that of the release command level. The pressurization is stopped at the point at which the pressure in the brake line of the last railway vehicle or freight car approaches the pressure corresponding to the release command level.

Another object is to provide an automatic air brake system in which the pressure in the brake lines of all of the railway vehicles or freight cars are pressurized and/or exhausted by the relay valve in the lead unit or locomotive in which a flow detector detects the flow of air pressure in the brake line of the above-mentioned lead unit or locomotive.

Another object of this invention is to construct an automated brake system which operates so that during the release command time, the pilot chamber in the relay valve is over-pressurized when the flow signal from the above-mentioned flow detector exceeds a predetermined value, and the above-mentioned over-pressurization is stopped when the flow signal falls below the predetermined value.

Generally, during the pressurization of the brake line by the relay valve in the lead unit or locomotive, the pressure status in the brake line of the last railway vehicle or freight car is delayed in relation to that in the lead unit or locomotive because of the speed of the air transmission and the resistance of the brake line. Therefore, even if the brake line of the lead unit or locomotive is pressurized up to the pressure corresponding to the release command signal, the pressure in the brake line of the last railway vehicle or freight car will still be low. If this pressure difference is great, the air flow in the brake line from the lead unit or locomotive to the last railway vehicle or freight car is relatively large, and the flow of air in the lead unit or locomotive is also relatively large. Now, when the pressure in the brake line of the last railway vehicle or freight car rises and approaches the pressure which corresponds to the release command pressure, the pressure difference in the brake line of the lead unit or locomotive and the last railway vehicle or freight car is relatively small, and the air flow in the brake line from the lead unit or locomotive to the last railway vehicle or freight car decreases. Thus, the flow of the air in the brake line in the lead unit or locomotive also decreases.

In practicing this invention, the flow of air in the brake line of the lead unit or locomotive is measured and detected, and the braking is based on this measurement. The pressure in the pilot chamber of the relay valve in the lead unit or locomotive is pressurized so that it is higher than the pressure corresponding to the release command, and the over-pressurization is stopped.

In other words, during the release command time, when the flow exceeds a predetermined value, namely, when the pressure difference in the brake line of the lead unit or locomotive and the last railway vehicle or freight car is relatively large, the pilot chamber of the relay valve is over-pressurized and the air supply capacity is kept high. Therefore, the release pressure in the brake line of the last railway vehicle or freight car is accelerated. Thus, the acceleration of the release pressure in the pressure in the brake line of the last railway vehicle or freight car will approach the pressure which corresponds to the release command. When the above-mentioned flow drops below the predetermined value, the above-mentioned over-pressurization of the relay valve is stopped, and a comparison corresponding to the release command is performed so that the brake line of all of the railway vehicles or freight cars will be pressurized up to the pressure which corresponds to the release command.

Therefore, by means of this invention, the operating repetition of the electromagnetic valve to switch the pilot chamber in the relay valve to over-pressurization or to a select pressure is much less than that of the prior art systems so that the overall life of the brake system is extended.

In addition, as described above, the flow of air in the brake line of the lead unit or locomotive to control the over-pressurization or the selected pressure is proportional to the pressure difference in the brake line of the lead unit or locomotive and the last railway vehicle or freight car so that in the case of a long train in which the number of connected railway vehicle or freight cars is large, the above-mentioned pressure difference is large and the pressure flow is also large so that the over-pressurization time becomes long. On the other hand, in the case of a short train in which a lesser number of railway vehicles or freight cars are connected, the above-mentioned pressure difference is small, its flow rapidly decreases, and the over-pressurization time is shortened.

Therefore, it is a further object of this invention to provide that the above-mentioned over-pressurization time is automatically changed depending on the number of railway vehicles or freight cars in a train so that an effective release acceleration becomes possible with any type of train consist.

In accordance with the present invention, there is provided an automatic air braking system for a railway train comprising, a flow detector connected to the brake line for sensing the flow of pressurized air in the brake line during a release command time; a pilot chamber located in a relay valve, which is pressurized when a signal from said flow detector exceeds a first predetermined pressure value, and which stops the pressurization when the flow signal drops below a second predetermined pressure value; said brake line runs from the lead unit or locomotive of the train and through railway vehicle or freight cars connected to and pulled by said lead unit or locomotive; a relay valve which is an automatic, overlap-type located in said lead unit or locomotive in which said pilot chamber is exhausted in response to the reception of a brake command, and which is pressurized in response to the reception of a release command; an output chamber, which is connected to the brake line of said lead unit or locomotive, and said output chamber is pressurized in response to pressurization of said pilot chamber and is exhausted in response to the exhaustion of said pilot chamber.

DESCRIPTION OF THE DRAWINGS

The above objects and other attendant features and advantages will be more readily appreciated as the present invention becomes better understood by reference to the following detailed description when considered in conjunction with the accompanying drawings, wherein.

DETAILED DESCRIPTION OF THE INVENTION

Figure 1:
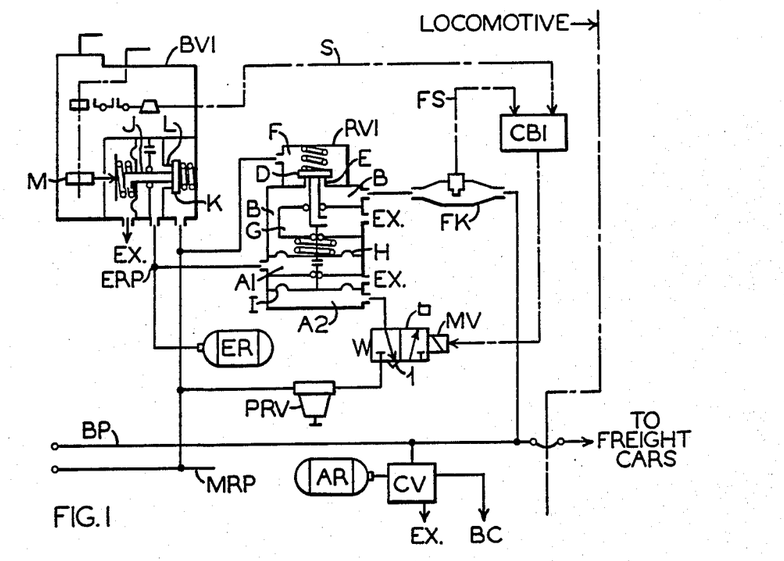
FIG. 1 is a schematic block diagram of one embodiment of an automatic brake control system for a railway train in accordance with the present invention.

Referring now to the drawings, and in particular to FIG. 1, there is shown a schematic block diagram of the apparatus and interconnections of the railway brake control system in accordance with the present invention. Initially, it will be assumed that a certain degree of braking is being initiated by the control system on the railway train.

At this time, the brake valve BV1 supplies the status signal S to the controller CB1, wherein S is equal to zero (0). Further, it will be seen that the brake valve BV1 is also in the overlapped state in which the air supply valve K is seated on the air supply valve seat L. It will be seen that the hollow exhaust valve rod J cooperates with the supply valve K to open and close the exhaust port EX. The pressurized force from the pressure ERP from the balance air reservoir ER is offset by the pushing force exerted by the cam operated plate M. The pressure ERP is exhausted in response to the brake command, and it is maintained at that reduced pressure.

In addition, because the above-mentioned status signal S is equal to zero (0), the electrical controller CB1 switches the electromagnetic valve MV to its OFF condition so that it assumes the exhaust position 1.

Therefore, the relay valve RV1 assumes the lapped state in which the first pilot chamber A1 maintains the pressure level ERP of the balance air reservoir ER and, at the same time, the second pilot chamber A2 is open to the atmosphere through the exhaust position ⦀ of the electromagnetic valve MV. Thus, the output chamber B, namely, the brake line BP is maintained at the same pressure as the above-mentioned pressure ERP and the air supply valve D, which is in contact with the hollow exhaust valve rod C, remains seated on the air supply valve seat E.

In addition, since the brake line BP is reduced and maintained at the reduced level, the brake control valve CV on each railway vehicle or freight car is in the overlap state after braking operation, and the brake cylinder BC holds the reduced pressure of the brake line BP, namely, the pressurized air corresponds to the braking command.

Figure 2:
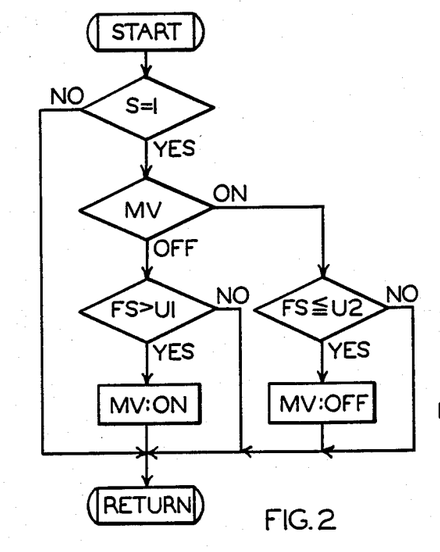
FIG. 2 is a flow chart showing the logic for controlling the braking operation of the system of FIG. 1.

In viewing FIG. 2, it will be seen that there is shown the control flow chart for the above-mentioned controller CB1.

Figure 3:
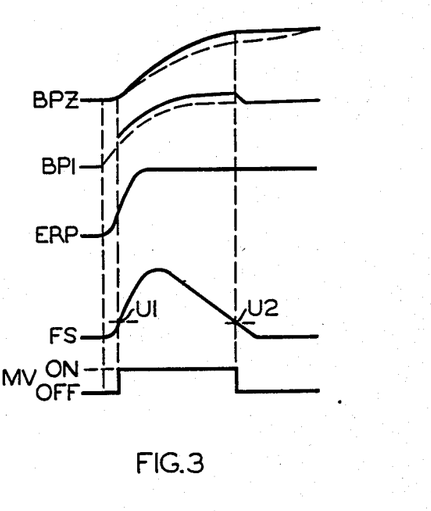
FIG. 3 is a graphic representation of the pressure responses of the brake pipes, balanced air reservoir, and flow signal, as well as the state of the electromagnetic valve of FIG. 1.

The operation, during a brake release command, will now be explained with reference to the accompanying FIGS. 1 to 3.

Let us assume that the system is in the brake-hold state, as shown in FIG. 1, and that the brake valve BV1 is moved to released position. Under this condition, the status or command signal S changes to a one (1). Thus, the pushing force exerted by the cam plate M is increased and the exhaust valve rod J moves to the right, as shown in FIG. 1. This causes the air supply valve K to separate, or unseat, from the air supply valve seat L, and causes air pressure to be fed into the balance air reservoir ER from the main brake line MRP so that the pressure ERP rises proportionately.

Because of the pressurization of this balance air reservoir ER, the first pilot chamber A1 of the relay valve RV1 is pressurized. This causes the exhaust valve rod C to move upward, as viewed in FIG. 1, so that the air supply valve D is separated, or unseated, from the air supply valve seat E. This operation is called a release air supply action.

Therefore, the pressurized air in the main air reservoir line MRP is supplied into the brake line BP through the air supply chamber F, the output chamber B of the relay RV1, and the flow detector FK so that pressure in the brake line BP rises proportionately.

Accompanying this pressurization of the brake line BP, the brake control valve CV starts the brake release action by exhausting the brake cylinder BC.

In the above-mentioned early stage of brake release operation, the difference of the pressure BP1 in the brake line BP in the lead unit or locomotive and of the pressure BPZ in the brake line in the last railway vehicle or freight car is great, so that the flow rate signal FS increases rapidly and soon exceeds the first predetermined pressure value U1 so that the electrical controller CB1 switches the electromagnetic valve MV to an ON condition. This causes the electromagnetic valve MV to shift to the air supply position □.

Therefore, the pressurized air is supplied from the main reservoir line MRP, through the adjustable pressure regulating valve PRV, and into the second pilot chamber A2 of relay valve RV1 via the open air supply position □ of the electromagnetic valve MV. Thus, the sum of pilot pressures in the relay valve RV1 is excessively pressurized. Accordingly, the supplemental piston diaphragm I pushes against the balance piston diaphragm H to cause further upward movement. Therefore, the air supply valve D moves further away from the valve seat E, which increases the amount of the air supply capacity.

Because of the increased air supply capacity of the relay valve RV1, the brake line BP pressurization for brake release in the last railway vehicle or freight car car is accelerated.

When pressurization of the brake line BP of the last railway vehicle or freight car approaches the one corresponding pressure in response to the release command initiated by the accelerated action, the pressure difference in the brake line BP of the lead unit or locomotive and the last railway vehicle or freight car is substantially decreased. Thus, the flow rate signal FS will decrease below the second predetermined value U2, wherein U2<U1, so that the controller CB1 switches the electromagnetic valve MV to an OFF condition and returns it to the exhaust position ⦀.

Therefore, the second pilot chamber A2 of the relay valve RV1 is opened to atmosphere, and the pilot pressure returns to the pressure level ERP in the chamber A1, which corresponds to the original release command level. The over-sized air supply capacity is markedly reduced. Thus, the pressure in the output chamber B offsets, or balances, with the ERP pressure in chamber A1 so that the relay valve RV1 assumes the overlap state, as shown in FIG. 1. Then, the pressure in the brake lines BP of all of the railway vehicle or freight cars of the train is averaged and becomes the pressure which corresponds to the brake command to release pressure.

At this time, the brake control valve CV on each railway vehicle or freight car fills the supplemental air reservoir AR, and causes the pressure in the brake cylinder BC to assume the level corresponding to the brake release command signal.

In the above-mentioned brake release condition, when the brake valve BV1 is in normal braking operation, the valve BV1 again assumes the position, as illustrated in FIG. 1, for reasons described above.

Figure 5:
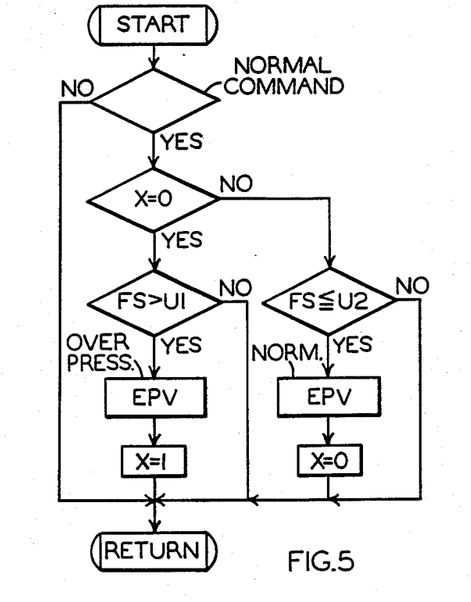
FIG. 5 is a flow chart showing the logic for controlling the braking operation of the system of FIG. 4.
Figure 6:
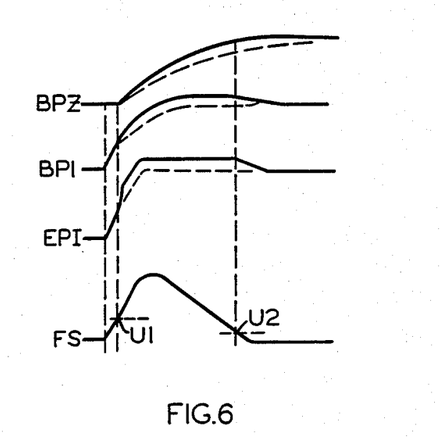
FIG. 6 is a graphic representation of the pressure versus time of the brake pipes, balanced air reservoir, and flow signal.

Referring now to the second embodiment of the invention, the operation and the details will be explained with reference to FIGS. 4 to 6. It will be seen that FIG. 5 is the flow chart of the electrical controller CB2 embodied in FIG. 4.

Figure 4:
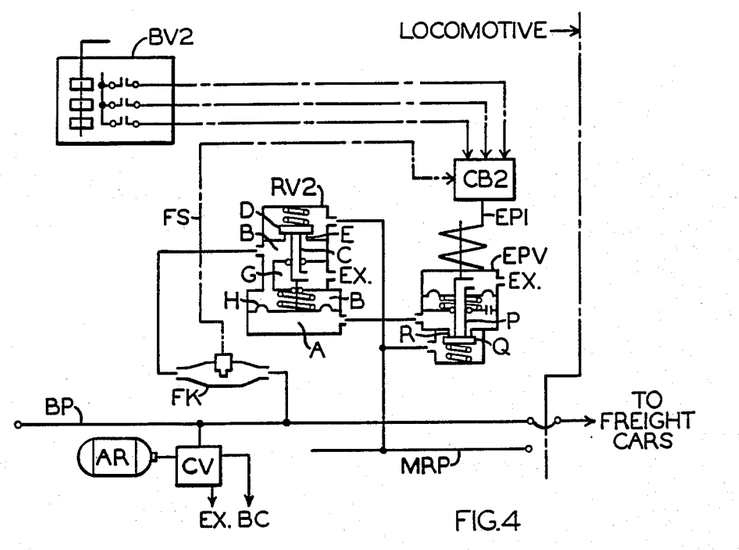
FIG. 4 is a schematic block diagram of another embodiment of an automatic brake control system for a railway train in accordance with the present invention.

In FIG. 4, the brake controller BV2 transfers the brake command signal and the release command signal, which may be represented by one (1) of seven (7) notches and which may take the form of a 3 bit digital signal connected and supplied to the electrical controller CB2.

Based on the particular selected command by the brake controller BV2, the controller CB2 controls the given command current EPI supplied to the electropneumatic conversion valve EPV. Thus, the electropneumatic pressure conversion valve EPV pressurizes or exhausts its output control chamber B which is connected to the pilot chamber A of the relay valve RV2. It will be appreciated that the energy level and voltage polarity of the command current EPI is a function of the selected position of the brake valve BV2.

In viewing FIG. 4, it will be assumed that the system has received a normal brake command signal.

At this time, the controller CB2 supplies a command current EPI, which corresponds to the normal brake command signal, to the electropneumatic conversion valve EPV. Under this condition, the electropneumatic conversion valve EPV will assume an overlapped state in which the air supply valve Q is seated against the hollow exhaust valve rod P and is settled on the air supply valve seat R. Thus, the pilot chamber A of the relay valve RV2 is controlled by the above-mentioned normal brake command signal.

Therefore, when the relay valve RV2 is in the overlap state, the air supply valve D is seated against the hollow exhaust valve rod C and is also seated on the air supply valve seat E. Thus, the relay valve RV2 maintains the output chamber B at the pressure level of the brake line BP, and the pilot chamber A is depressurized and is maintained in that condition.

Since the brake line BP is depressurized, the brake control valve CV of each railway vehicle or freight car is in the overlap state after a braking operation. This causes the brake cylinder BC to maintain the air pressure corresponding to the amount of the braking command in the brake line BP.

The brake release operation will now be explained also with reference to the accompanying FIGS. 4 to 6.

In the above-mentioned brake overlapped state of FIG. 4, when the engineer initiates a brake release, the controller CB2 increases the command current EPI corresponding to this release command.

Because of the increase in the command current EPI, the electropneumatic conversion valve EPV increases the magnetic attractive force and moves the exhaust valve rod P downwardly, as shown in FIG. 4. This causes the air supply valve Q to unseat from the air supply valve seat R so that it begins to pressurize the pilot chamber A of the relay valve RV2.

Because of the pressurization of the pilot chamber A in the relay valve RV2, the exhaust valve rod C moves upwardly, as shown in FIG. 4, so that the air supply valve D is unseated from the air supply valve seat E. Therefore, the brake line BP begins to be pressurized from the main reservoir line MRP through the output chamber B and the flow rate detector FK.

Accompanying this operation at the lead unit or locomotive, the brake control valve CV on each railway vehicle or freight car starts to exhaust the brake cylinder line BC to initiate a brake release action.

In the early state of the brake release, the difference of the pressure BP1 in the brake line BP of the lead unit or locomotive and of the pressure BPZ in the brake line of the last railway vehicle or freight car of the train is relatively large, and the flow rate in the brake line BP of the lead unit or locomotive is relatively large, so that the flow rate signal FS rapidly increases and quickly exceeds the first predetermined value U1. Thus, the controller CB2 increases the command current EPI from a normal value to an increased pressure level.

Therefore, the air supply valve Q of the electropneumatic pressure conversion valve EPV further opens or unseats the valve seat R, so that the pilot chamber A of the relay valve RV2 is further pressurized. Thus, the air supply valve D of the relay valve RV2 further opens or separates the valve seat E to make a larger air supply capacity or a greater air flow.

Because of this increase of the air supply capacity in the relay valve RV2, the rate of pressure increases in the brake line BP in the last railway vehicle or freight car so that quicker brake release occurs.

Then, when the brake line BP pressure value in the last railway vehicle or freight car approaches the specified pressure, corresponding to the brake release command, the pressure difference from the brake line BP of the lead unit or locomotive and the last railway vehicle or freight car becomes relatively small. Thus, the air supply flow to the last railway vehicle or freight car significantly decreases so that the flow rate signal FS drops below the second predetermined value U2. Thus, the controller CB2 reduces the command current EPI so that the increased pressure level returns to the normal value.

Therefore, the electropnematic pressure conversion valve EPV resets the pilot chamber A of the relay valve RV2 to a specified pressure corresponding to the release command. Thus, the relay valve RV2 decreases its air supply capacity and switches to the overlap state. After that, the brake line BP pressure in all of the cars is averaged so that the pressure corresponds to the release command.

At this time, the brake control valve CV of each car fills the supplemental air reservoir AR and, at the same time, makes the pressure in the brake cylinder BC correspond to the release command.

In the above-mentioned released state, the brake controller BV2 returns back to normal braking operation and assumes the condition as illustrated in FIG. 4.

In the first embodiment of FIG. 1, described above, the increased pressure command is turned ON and OFF by the electromagnetic valve MV so that the total pilot pressure in the relay valve RV1 changes in steps. If the increased pressure command is relatively large, the pressure in the brake line BP of the lead unit or locomotive decreases by the step during the OFF period or time of electromagnetic valve MV. That is, since the increase in pressure ceases, the brake control valve CV of the lead unit or locomotive could repeat the braking operation, which is unacceptable. Therefore, the increased pressure command steps should not be too large.

In comparing the above with the second embodiment, shown in FIG. 4, it will be noted that the pilot pressure can be controlled in an analogic manner by the electropneumatic pressure conversion valve EPV, so that it is possible to decrease the pressure in the brake line BP continuously when the increased pressure command is OFF. The increased pressure can be preset so that it is greater than shown in the first embodiment. Thus, a sufficient accelerated release can be readily achieved.

In addition, the command signals may be produced by an automatic train control system (ATC) or automatic train operation system (ATO) to effectively control the increased pressure operation, or the specified increased pressure operation. These commands can be either digital signals or analog signals.

In addition, it will be seen that the predetermined value of the flow signal FS, the first predetermined value U1, and the second predetermined value U2 are all different from each other. However, it will be appreciated that they can also be the same value.

The following is a listing of the components shown in the drawings and described in the specification:

AR: supplemental air reservoir
ER: balance air reservoir
VR: buffer air reservoir
CV: brake control valve
RV1, RV2, RV3: relay valves
A, A1, A2: pilot chambers
BV1, BV2, BV3: brake valves
B: output chamber
CB1, CB2, CB3: electrical controllers MV, MV1, MV2: electromagnetic valves
MRP: main air reservoir
PRV: pressure regulating valve
FK: flow rate detector
FS: flow rate signal
C: exhaust valve rod
D: air supply valve
E: air supply valve seat
F: air supply chamber
H: balance piston diaphragm
I: supplemental piston diaphragm
J: exhaust valve rod
K: air supply valve
L: air supply valve seat
M: cam plate
P: hollow exhaust valve rod
Q: air supply valve
R: air supply valve seat
S: status signal
EPI: command current
ERP: pressure line
EX: exhaust port
NV2: throttle valve
BC: brake cylinder
PRV: pressure regulating valve
FK: flow detector
U1, U2: predetermined pressure values
BP: brake line
BP1: pressure of the brake line of the locomotive
BPZ: pressure in the brake line of the last car.
EPV: electropneumatic pressure conversion valve Thus, the present invention has been described in such full, clear, concise and exact terms as to enable any person skilled in the art to which it pertains to make and use the same, and having set forth the best mode contemplated of carrying out this invention. It is understood that the subject matter, which I regard as being my invention, is particularly pointed out and distinctly set forth in what is claimed. It will be understood that variations, modifications, equivalents, and substitutions for components of the above specifically-described embodiment of the invention may be made by those skilled in the art without departing from the spirit and scope of the invention as set forth in the appended claims.

I claim:

1. An automatic air braking system for a railway train comprising, a flow detector being connected to the brake line for sensing the flow of pressurized air in a brake line during a brake release command time, a pilot chamber being located in a relay valve being pressurized when a flow signal from said flow detector exceeds a first predetermined pressure value and which stops the pressurization when the flow signal drops below a second predetermined pressure value, said brake line running from the lead unit or locomotive of the train and through the railway vehicle or freight cars connected to and pulled by said lead unit or locomotive, said relay valve being an automatic-lapping-type valve and being located in said lead unit or locomotive in which said pilot chamber being exhausted in response to the reception of a brake command and which is pressurized in response to the reception of a brake release command, an output chamber being located in said relay valve and being connected to said brake line of said lead unit or locomotive, and said output chamber being pressurized in response to the pressurization of said pilot chamber and being exhausted in response to the exhaustion of the pilot chamber so as to accelerate the brake operation along the length of the train.

2. The automatic air braking system for a railway train, as defined in claim 1, wherein a manually-operated brake valve initiates an analog signal.

3. The automatic air braking system for a railway train, as defined in claim 1, wherein a manually-operated brake valve initiates a binary signal.

4. The automatic air braking system for a railway train, as defined in claim 2, wherein an electrical controller receives the analog signal from said brake valve.

5. The automatic air braking system for a railway train, as defined in claim 3, wherein an electrical controller receives the binary signal from said brake valve.

6. The automatic air braking system for a railway train, as defined in claim 4, wherein said electrical controller being connected to an electromagnetic valve which is pneumatically-connected to said pilot chamber of said relay valve.

7. The automatic air braking system for a railway train, as defined in claim 6, wherein a pressure regulating valve being pneumatically-connected from a main reservoir line to said electromagnetic valve.

8. An automatic air brake system for accelerting the exhaustion of pressure in the brake line of a train comprising, a flow rate detector being located in the brake line of the locomotive to detect the flow of air in the brake line, a pilot chamber of a relay valve being supplemented when a flow signal from the flow rate detector exceeds a predetermined value, and the supplementation of the pilot chamber being stopped when the flow signals drops below a predetermined value, the pilot chamber being exhausted in response to a brake application command and being pressurized in response to a brake release command, the relay valve includes an output chamber being connected to the brake line of the locomotive, the brake line pressurizes and exhausts the output chamber in response to the pressurization and exhaustion of the pilot chamber.

9. An automatic brake control system for a railway train comprising, a brake line extending the length of the train, a brake valve for initiating a brake application command and a brake release command, a relay valve having output and pilot chambers, a flow rate detector being connected between the brake line and the output chamber, a controller receiving a status signal from the brake valve and a flow signal from the flow rate detector, an electromagnetic valve controlled by the controller to pressurize the pilot chamber to accelerate the exhaustion of the brake line during a brake application command.

10. The automatic brake control system, as defined in claim 9, wherein the relay valve includes a supply, an exhaust, and a lap position.

11. The automatic brake control system, as defined in claim 9, wherein the electromagnetic valve includes a supply and an exhaust position.

12. The automatic brake control system, as defined in claim 9, wherein a pressure regulator valve being connected between a main reservoir pressure line and the electromagnetic valve.

* * * * *

UNITED STATES PATENT AND TRADEMARK OFFICE
CERTIFICATE OF CORRECTION

PATENT NO. : 4,854,648
DATED : August 8, 1989
INVENTOR(S) : Yasuo Nakao

It is certified that error appears in the above-identified patent and that said Letters Patent is hereby corrected as shown below:

Column 12, line 34, delete "signals" and insert --signal--

Signed and Sealed this

Fifth Day of June, 1990

Attest:

HARRY F. MANBECK, JR.

*Attesting Officer*  *Commissioner of Patents and Trademarks*